June 26, 1945. D. C. REYBOLD ET AL Re. 22,652

APPARATUS FOR TREATING IMPURE LIQUIDS

Original Filed Dec. 18, 1941 3 Sheets-Sheet 1

INVENTORS
ANTHONY J. FISCHER
DOUGLAS C. REYBOLD
BY
BY Arthur Middleton
ATTORNEY.

June 26, 1945. D. C. REYBOLD ET AL Re. 22,652

APPARATUS FOR TREATING IMPURE LIQUIDS

Original Filed Dec. 18, 1941 3 Sheets-Sheet 2

INVENTORS
ANTHONY J. FISCHER
DOUGLAS C. REYBOLD
BY
Arthur Middleton
ATTORNEY.

June 26, 1945. D. C. REYBOLD ET AL Re. 22,652

APPARATUS FOR TREATING IMPURE LIQUIDS

Original Filed Dec. 18, 1941 3 Sheets-Sheet 3

INVENTORS
ANTHONY J. FISCHER
DOUGLAS C. REYBOLD
BY Anton Nissenbaum
ATTORNEY.

BY

Reissued June 26, 1945 Re. 22,652

UNITED STATES PATENT OFFICE 22,652

APPARATUS FOR TREATING IMPURE LIQUIDS

Douglas C. Reybold, Northbrook, Ill., and Anthony J. Fischer, Manhasset, N. Y., assignors to The Dorr Company, New York, N. Y., a corporation of Delaware Original No. 2,340,842, dated February 1, 1944, Serial No. 499,812, August 24, 1943, which is a division of Serial No. 423,430, December 18, 1941. Application for reissue August 29, 1944, Serial No. 551,711

14 Claims. (Cl. 210—5)

This invention relates to the purification of polluted or impure liquids such as sewage, trade-wastes and the like, and this application is a division of application No. 423,430 filed December 18, 1941. In such purification, one recognized method in use today involves the use of a bed of discrete material containing biological organisms which include a wide range thereof from bacterial flora up to animal life as exemplified by worms. The biological organisms are depended upon to convert the unstable and putrescible or septical organics that render the liquid impure into stable innocuous substances. The organisms are also depended upon, at least in part, to render non-settleable suspended solids more readily settleable.

The invention has relation to what is known in the sanitary engineering art, as trickling filter-beds. Of late it has come to be accepted that it is desirable to supply liquid to be treated in filter-beds at rates that would have been considered a few years ago as dangerously high. This invention has especial application to high-rate filter-beds. An outgrowth of the high-rate filter-bed is that there be associated with it a recirculation system whereby liquid being treated can be repeatedly or continually recirculated through the filter-bed. This permits the continuous dosing on the filter-bed of a liquid more uniform in character, and reduces the extreme fluctuations in flow. In most systems one or more detention tanks are associated with the filter and the recirculation system may be so arranged that filter effluent is recycled back to the detention tank or primary clarifier preceding the filter; or detention tank or secondary clarifier effluent is recycled back to the filter which preceeds the detention tank. In either case the filter is dosed at such a rate with liquid containing micro-organisms favorable to the promotion of optimum biological conditions in the filter bed that clogging of the filter bed is avoided due to a continuous sloughing off of the solids that would normally tend to accumulate. At the same time, the recirculation from the filter to the primary clarifier or from the secondary clarifier to the filter dilutes the strength of the liquid fed to the filter so that it becomes more amenable to treatment. The detention tank is usually provided with means for mechanically cleaning it of deposited sediment to guard against septicity of the sediment, and the tank is one from which overflows a clarified effluent.

In recirculation types of trickling filter plants involving a filter and a clarifier in closed-circuit, the rate of filter application may be multiples of the rate of new feed incoming to the system. The new feed may be introduced at any suitable point. Likewise, the effluent may be discharged from the system at any desired point.

Among other advantages realizable, mention is made of the fact that recirculating trickling filter systems gave the unexpected result of permitting the use of filter beds only three feet or less in depth which could be operated at high efficiency. This permits the use of high filter loadings figured as pounds of B. O. D. per cubic yard of filtering media per day. It has been found that the efficiency of recirculating type filters increases as the amount of recirculation increases. The high rates of dosing tend to prevent clogging of the interstices between the discrete stone particles of the filter media; ample food is brought to the immotile biologic organisms of the bed; their excretions are washed away therefrom; and some of the organisms are washed into the clarifier so that biologic oxidizing activity of the septical organics is continued in the clarifier in addition to the bed where it its initiated. This method of operation also keeps down the filter-fly nuisance and further keeps down the odor nuisance.

The disadvantage of the use of such high recirculation rates, however, is that a large and expensive piping system is required to convey the clarifier effluent to the trickling filter bed, otherwise a high loss of head will result, possibly requiring the pumping to the beds.

According to the present invention a liquid treating system is employed wherein a relatively shallow bed of discrete material is disposed in encircling arrangement with respect to a liquid-receiving tank of a type which may function as a clarifier. The tank is furthermore of a type having supernatant outflow means disposed about and leading from the upper marginal regions thereof. Also according to the present invention such shallow bed of discrete material functions as a trickling filter-bed extending to an elevation whereby gravitating filter effluent can be collected and, according to operative requirements, pumped back into the tank substantially against only a minimum or relatively low back pressure head. The top of the filter-bed is disposed at elevation sufficiently low so that there can always be realized a gravity flow of clarified liquid from the supernatant outflow means, to wit, from the region about the upper marginal portion of the tank, and consequent spraying of the gravity-conveyed liquid over the trickling filter-bed in a relatively uniform distribution. The use of the shallow bed encircling the tank with its surface lower than the liquid level in the clarifier tank assures the gravity feed to the filter-bed directed from the clarifier through a conducting and distributing means which may be relatively simple and of low cost. This may be through a means embodying a number of relatively uniformly but horizontally spaced individual pipes extending downwardly from the uper marginal regions of the tank and of which the pipes terminate in spray heads or other suitable liquid diffusing delivering means. Each of these pipes is preferably provided with a valve therein whereby the flow therethrough and therefrom may be adjusted to operative requirements or according to the particular type of operation decided upon. The use of a shallow bed encircling the clarifier assures gravity feed to the filter-bed direct from the clarifier through a pipe system of low cost.

In the practice of straight or once-through filtration, over which the recirculating type was an improvement, the overflow from a primary clarifier passes through the trickling filter where biological sludge is formed and the filter-treated liquid enters a secondary clarifier where separation of the liquid is effected into settled sludge and effluent.

The straight filter must be dimensioned and operated to effect as completely as possible the biological purification and coagulation of sewage impurities within the interval allowed for a single passage through the filter. This necessitated a large volume of filter media and a depth of the filter which was accepted to be from 6 to 12 feet. This depth was so much the standard that it became a custom with sanitary engineers in specifying filter loads or capacities, to disregard the factor of filter depth as a constant and refer to filter capacity in terms of area or horizontal expanse only. Then there was accepted for filter capacity or load the dimension "m. g. a. d."; that is, "million gallons per acre per day."

Since the patentees are working essentially with a shallow filter-bed in circuit with a detention tank or clarifier, the invention has for one of its objects an arrangement for the proper integration of these elements while they are concentrically disposed, with the clarifier or detention tank in the center and the filter-bed or beds encircling the clarifier. Another object is to modify this arrangement for two-stage treatment. And a further object is to provide means for returning the filter-bed discharge back to be mixed with the liquid in the clarifier tank. A still further object is to provide means in this assembly for thoroughly distributing over the filter-bed area, the liquid passing thereto. Another object is to make such an assembly into an esthetically attractive design, for sewage-treating plants are being located increasingly in parks or other public spaces of municipalities that are more or less landscaped.

An additional object is the provision fo a multiple launder for the clarifier so that effluent for release from the system is taken from one launder that is functionally separate or remote from another launder whose liquid is passed for distribution over the filter-bed surface.

Another object is to provide an arrangement whereby the liquid from the clarifier can be supplied to the filter-bed and distributed thereover substantially uniformly while under a constant head. And a still further object is to devise apparatus for dosing the filter-bed direct from a launder of the clarifier.

In connection with recirculation of liquid from the clarifier tank that is in circuit with the filter-bed back to the filter-bed, it has been found advantageous to recirculate liquid from the liquid-body that lies within the clarifier tank rather than liquid that has once passed from the tank by overflowing an effluent weir. Therefore a further object of this invention is to devise a submerged launder for the clarifier from which liquid can be supplied to the filter-bed, especially by gravity and at a constant head.

As illustrative of certain manner in which the invention hereof may be realized, reference is made to the accompanying drawings constituting a part of this specification.

In said drawings—

Figure 1:
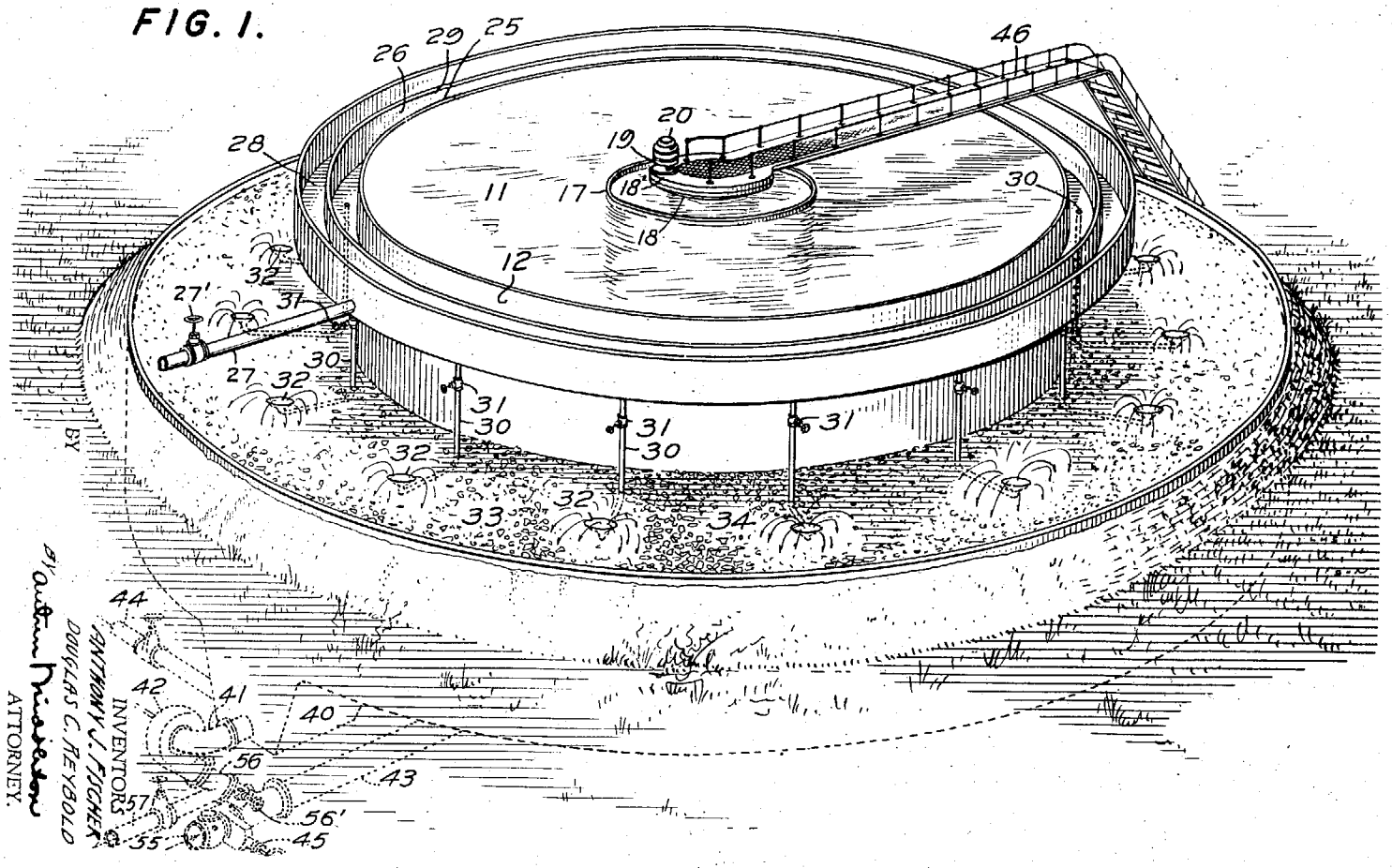
Fig. 1 is a perspective illustrating one form of the invention.
Figure 2:
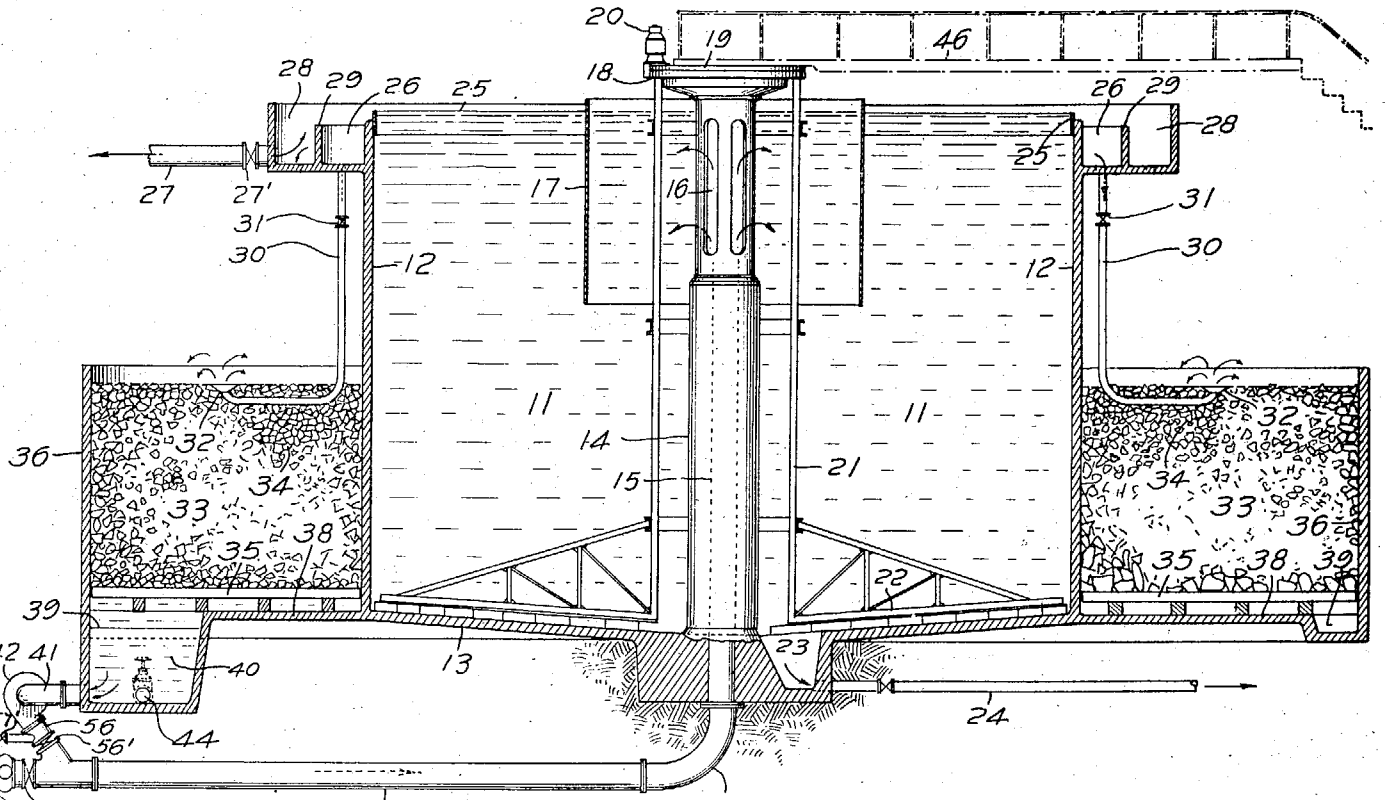
Fig. 2 is a vertical sectional view of the form shown in Fig. 1.

In Figs. 1 and 2 the reference numeral 11 indicates generally a clarifier tank having a wall section 12, a bottom or floor section 13, an upstanding pier 14 that is hollow and has a bore 15 from which feed liquid for the tank 11 is emitted in a slotted section 16. 17 indicates a baffle for deflecting the feed liquid and preventing short-circuiting. The pier 14 terminates in a platform 18 that supports a bull ring or gear providing an anular turntable 19 that is rotated through the medium of a motor 20 and any necessary gearing. The motor is carried on a stationary member 18' extending upwardly from the platform 18 through the turntable 19 as for example according to the teachings of the Scott Reissue Patent Re. 20,072. Supported from the turntable 19 is a depending cage or drum 21 from which at the bottom thereof extend rake arms 22 that are equipped to impel sediment over the tank floor to a sludge discharge sump 23 that is connected with a valve controlled sludge discharge pipe or conduit 24.

Clarified supernatant liquid in the tank 11 overflows a weir 25 that determines the liquid level in the tank, and passes into a launder 26 that encircle the tank. Associated with the first annular launder 26 is a further annular launder 28 which makes with launder 26 a combined or double launder that has a common wall 29. Liquid flows from launder 26 at intervals around its length, through a plurality of downflow pipes 30, which may be controlled by valves 31, terminating in spray nozzles or other liquid distribution means 32 located ajacent the upper surface of a trickling filter-bed 33 formed of discrete material or media 34 such as crushed stone or rubble that is supported from a permeable lattice-like support 35 and a wall 36 that encircles the tank 11. The top of the filter-bed 33 is lower than the liquid level of the tank 11. Liquid passes from launder 28 through conduit 27 controlled by valve 27' to discharge or for further treatment. The floor 38 of the filter-bed 33 is arranged to drain filter-discharge into an annular trench or sump 39 that has associated with it a wet-well 40 from which filter discharge can be removed through pipe 41 by centrifugal pump 42 which delivers into pipe 56 having a stop valve 56'. By closing stop valve 56' the filter effluent can be passed from the filter through a pipe 57 equipped with stop valve 57' if and when the latter is open; or if the stop valve 56' is open and the stop valve 57' is closed, then the pump 42 will force the filter effluent into the pipe or conduit 43 thence into bore 15 of upstanding pier 14 so that the filter discharge re-enters the clarifier tank 11 for re-treatment therein. Filter discharge may be drained from the system as through a valve controlled pipe 44. 45 indicates a stop valve in pipe 43 and 55 indicates a check valve in pipe 43. This pipe 43 may be employed as means for passing newly incoming feed to clarifier tank 11 as well as part of the means for passing filter effluent to the tank. 46 indicates a bridge or walkway for giving access to the operating parts of the tank 11.

Figure 4:
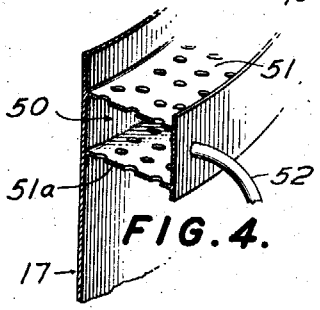
Fig. 4 is a detail of a submerged weir or launder employed in the form of Fig. 3.
Figure 3:
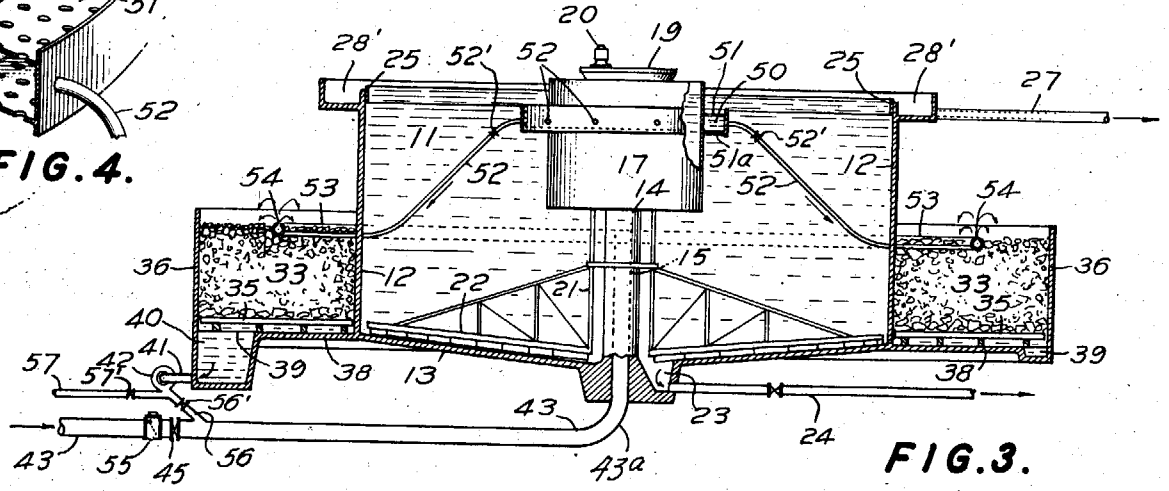
Fig. 3 is a vertical sectional view of a form somewhat different from that shown in Fig. 2.

Figs. 3 and 4 illustrate a modification or form which differs only slightly from that of Figs. 1 and 2. Where the parts are the same in each, the same reference numerals have been used and as to such like parts the previous descriptive matter relating thereto applies and is not being repeated. In this modification the newly incoming feed liquid is supplied through the low pipe or conduit 43 thence to the bore 15 of hollow pier 14 from whence it passes into the clarifier tank 11. Clarified supernatant liquid is released from the tank by overflowing annular peripheral weir 25 into peripheral launder 28' from whence the liquid is released or passed outwardly through pipe 27. In this modification, the second launder is shown as a member 50 supported from the baffle 17. This second launder is in the form of a tubular collector or submerged launder disposed below the liquid level of the tank 11 and is protected from scum and the like by means of a top cover or strainer plate 51 that is preferably perforated to let strained liquid flow freely into the launder. As shown in Fig. 4, the top strainer plate 51 of launder 50 may also have associated with it a bottom strainer or perforated plate 51a. In fact, this second launder just described may be viewed as a submerged perforated collecting ring. From this submerged launder, liquid passes at intervals through spaced-apart pipes 52 having valves 52' for controlling or adjusting the quantity of flow to a distributing pipe 53 which is annular in plan and disposed adjacent the top of the filter-bed. This pipe 53 is provided with suitable overflow passage area as by being slotted at 54 from which liquid is relatively uniformly distributed over the surface of the filter-bed 33. The centrifugal pump 42 returns filter-bed discharge through the valve-controlled pipe 56 to the low pipe or conduit 43. It will be noted, however, that the discharge from the pump can be also pumped to release from the system through the valve controlled release pipe 57 having the stop valve therein.

The quantity of normal supply of feed to the tank, to wit, the supply of fresh feed to the tank plus the returned or recycled filter effluent passed by the pump 42 into the pipe or conduit 43, is greater than the quantity of liquid which is allowed to flow into the submerged collecting ring and ultimately therefrom to and from the distributing pipe 53 and hence the overflow weir 25 is enabled to function as a means that determines the normal surface level of the liquid in the clarifier tank 11.

The slotted distributing pipe 53 is relied upon to insure a relatively uniform distribution of liquid passing therefrom to and throughout the upper portion of the filter-bed 33 whereby the thus distributed liquid is caused to trickle downwardly within and throughout the entire bed.

Figure 5:
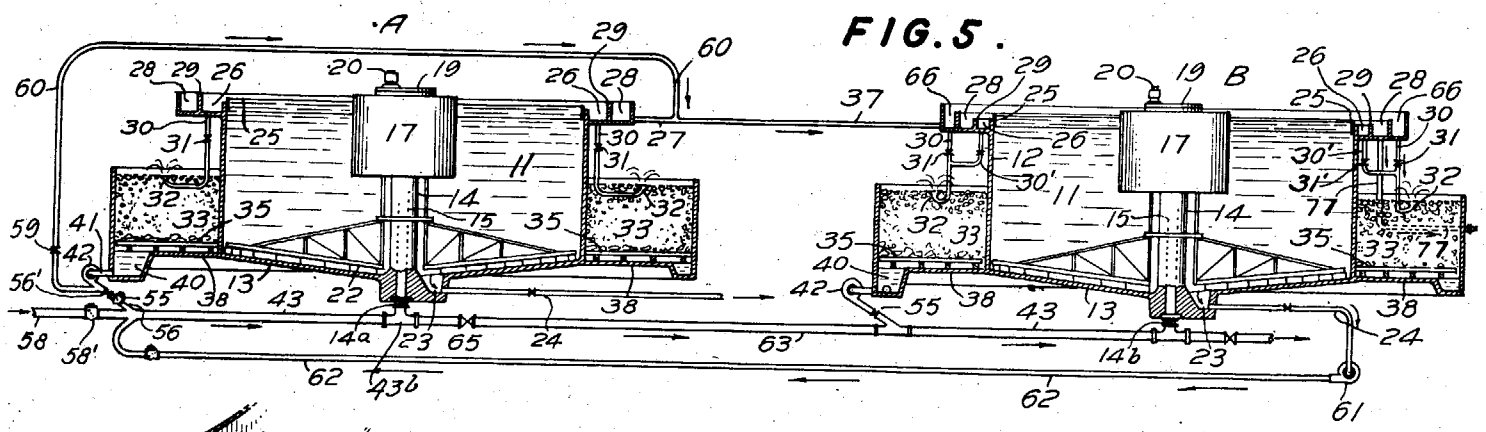
Fig. 5 is a vertical sectional view embodying primary and secondary stages each of which embodies certain important features of the form of apparatus shown in Fig. 2.

Fig. 5 illustrates a two-stage plant of which the first or primary stage indicated at A is substantially the same as arrangement of Fig. 2. The secondary stage of this Fig. 5 is indicated at B and is a modified form of the design at A. As to these two stages where the parts are the same like reference characters have been employed.

In reference to stage B, it will be noted that normally the liquid is supplied thereto through conduit 37 into an outer launder 66. From this launder the supplied liquid passes downwardly through valve-controlled pipes 30 from which it passes into and from distributing heads or means 32 by which the liquid is distributed relatively uniformly over the top surface of the trickling filter-bed 33. The liquid trickling from the filter-bed 33 is finally received as filter effluent in the sump 40. From this sump of the secondary stage B filter effluent is passed by pump 42 into and through the conduit 43 and the hollow pier 14 whereby it is ultimately delivered into the liquid-holding section of tank 11. Clarified supernatant liquid from this secondary tank 11 overflows weir 25 into the innermost launder 26 from which it passes, or from which at least some of it passes through branch pipes 30', by control valves 31' therein, into valve-controlled pipes 30 whereby it is distributed through the heads or members 32 of pipes 30.

It will be observed as to this secondary stage B that a partition member 29 is disposed between the innermost launder 26 and an intermediate launder 28. The top of this partition member 29 which is circular in plan or of other appropriate formation is at elevation lower than that of the overflow weir 25 and serves to acts as an outlying second or intermediate weir that permits an overflow of some of the clarified effluent from within the launder 26 towards and into launder 28. From the latter launder 28 the effluent is passed to a region remote from the tank through the conduit or pipe 77. Operations than can be carried out in the apparatus in this two-stage plant are typified by the following:

Liquid to be treated passes inwardly through conduit 58 past check valve 58' into conduit 43, thence upwardly through the hollow pier 14 of stage A whereby it is deivered into tank 11 of stage A. The clarified liquid from this tank overflows weir 25 into launder 26 from which the overflow liquid—or a controlled portion of the overflowed liquid—passes downwardly through valve-controlled pipes 30 by which it is distributed over the trickling filter-bed 33. Effluent from this bed passes into the sump 40, is pumped therefrom by a pump 42 (*a*) through a valve-controlled return branch 56, assuming the valve 56' is open, directly back into the tank 11 of the first stage, or (*b*) into the transfer branch 60, if the valve 59 therein is open, whereby the filter effluent, or some of it, may be transferred directly into the pipe 37 leading to the second stage. In other words, at the option of the operator all of the filter effluent can be pumped through branch 56 back into the tank, or only a part of the filter effluent will be pumped back into the tank, or none of the filter effluent need be passed back into the tank of stage A, in other words, if the valve 56' of this return branch is closed, then all of the filter effluent can be passed by the pump 42 through the branch 60, assuming the valve 59 of the latter is open. If valve 56' in the return branch and if the valve 59 in branch 60 are only partially open, then it is possible to give a split passage of the filter effluent whereby some will be returned to the tank 11 and some will be transferred through the branch 60 directly to the pipe 37 leading to the secondary stage B.

It will also be observed that the partion 29 between the inner and outer launders 26 and 28 is lower than the weir 25 whereby if desired—according to the position of the valves 31 in pipes 30—none of the overflow past weir 25 will pass partition 29, or some portion of or all of the overflow past weir 25 can be caused to pass over the partition 29 as a secondary overflow into the outer launder 28 from which this twice overflowed liquor can pass through valve-controlled pipe 27 into pipe 37 for gravity flow and delivery into the launder 66 of the secondary unit B. From the outer launder 66 the liquid is distributed directly over the filter-bed by the valve-controlled pipes 30. Filter effluent is pumped from the sump 40 of the secondary unit into the tank 11 thereof. The clarified liquid from this secondary tank 11 overflows the weir 25 and a portion thereof can be optionally passed back to the trickling filter-bed by means of the valve-controlled pipes 31 that lead as branches into the distributing pipes 30 while another passes the intermediate partition or secondary overflow member 29 into the discharge launder 28 and therefrom released from the apparatus. One valve is located at 14a and another at 14b in the respective conduits leading to the hollow piers of the tanks of the primary and secondary stages. By closing the valve 14a of the primary stage it is feasible to pass incoming liquid supplied for treatment directly to the second stage whereby the operations of the first stage can be eliminated and the trickling filter treatment can be carried out entirely at the second stage. Sludge from the tank of the second stage is passed by the pipe 24, pump 61 and pipe 62 as return sludge that is delivered to a section of the pipe 43 leading to the primary stage.

With respect to the apparatus of Fig. 5, it has heretofore been pointed out how the secondary stage can be employed as a single unit. It is now to be noted that the outer wall of the outlying launder 66 of the secondary stage B extends to an elevation higher than that of the rising wall or partition between the outlying launder 66 and the intermediate launder 28. If for any reason it is desired to temporarily employ only the primary stage A as a sludge treating unit this can be accomplished by closing valve 14b in the feed line leading to the tank of stage B and by closing the valves 31 and 31' of the pipes 30 and 30' of stage B, allowing the effluent to pass from stage A through the pipe 37 into the outlying launder 66 of stage B, thence as overflow past the wall between the launders 28 and 66 and from the latter as effluent released from the system through pipe 77.

In connection with each of the combined settling tanks and trickling filter-bed units shown in the drawings hereof, it will be noted that the depth of each trickling filter-bed is relatively shallow as compared with the depth of the tank. As shown the construction providing the bottom or floor of the trickling filter-bed is shown practically as an extension of the bottom of the tank. With this arrangement a feed-supply pipe or influent conduit such as 43 can, without undue excavation, be located so as to extend directly below the floor of the filter as well as that of the settling tank.

The elevation of the top surface of each trickling filter-bed is substantially lower than that of the surface level of the liquid in the tank with which it is associated, or, as otherwise expressed, lower than the launders from which liquid is gravitationally passed through valve-controlled downflow pipes such as 30 and 31 for distribution over the top of the bed.

In Fig. 3 the launder or submerged pipe from which the liquid is supplied to the bed through the valve-controlled downflow pipes 52 is not disposed directly over the trickling filter-bed. However, it is located so that there is a gravital downflow of liquid from within the tank through the pipes 52 and ultimate distribution of the liquid over the bed. In the instance of each form illustrated the height available for effecting this gravitational transfer is substantially that difference in elevation between the upper surface of the trickling filter-bed on the one hand and the elevation or approximate elevation of the overflow weir 25. This difference in elevation or static head available is preferably of the order of from 3 to 4 ft. of water.

The structure shown in Fig. 2 or the structure shown in Fig. 3 can be readily substituted for the corresponding subcombination shown in Fig. 5:

(a) By merely connecting the pipe 27 of either Figs. 2 or 3 to the pipe section 37 leading to the outside launder 66 of Fig. 5; and (b) By substituting for the curved portion or section 43a of the pipe or conduit 43, of either Figs. 2 or 3, a T pipe section and valve substantially like that indicated in Fig. 5 by T pipe section 43b and the valve 14a.

With such changes it will be manifest how the apparatus or structure of Figs. 2 or 3 can be operatively incorporated in the arrangement of Fig. 5. While the launder or pipe 50 of Fig. 3 is submerged, it will be manifest that the gravitational flow therefrom downwardly through the pipes 52 can be controlled as to quantity delivered to the trickling filter bed served thereby by adjusting the valves 52' of said pipes, to wit, in a manner like that obtained by adjusting the valves 31 of Figs. 1, 2 or 5 whereby to control the quantity or rate of downward flow through the descending pipes 30. The valve control pipes 30 of Figs. 1, 2 or 5 and the valve-controlled pipes 52 have corresponding functions and relationships.

We claim:

1. Apparatus for treating impure liquids comprising in operative combination a settling tank equipped with means for transferring sedimented material therefrom; a set of inner and outer marginal launders of which the inner launder is disposed for receiving as effluent supernatant liquid overflowing from the tank and of which the outer launder is disposed for receiving as split-off effluent a quantity of liquid overflowing from said inner marginal launder; a trickling filter-bed of discrete material surrounding said tank; means providing a floor structure for said bed and having a sump for receiving filter effluent gravitating thereinto; valve-controlled downflow means for passing liquid from said inner marginal launder and for distributing the thus passed liquid over the trickling filter-bed; feed-supply means for passing to said tank liquid to be treated, pumping means for passing filter effluent from said sump back to the tank, and means for passing liquid from the outer launder along a pathway leading from the unit.

2. Apparatus as defined in and by claim 1, having associated with said pumping means valve-controlled branches of which one branch serves to optionally conduct the pumped liquid back to the tank and another serves to optionally conduct pumped liquid from the unit.

3. Apparatus for treating impure liquids comprising in operative combination a settling tank having means for transferring sedimented material therefrom; means associated with said tank providing inner, intermediate and outer marginal launders of which the inner launder is disposed for receiving as effluent supernatant liquid overflowing from said tank, of which the intermediate launder is disposed for receiving as split-off effluent a quantity of liquid overflowing from the inner launder, and of which the outer marginal launder is normally functionally separated from the intermediate launder; a trickling filter-bed of discrete material disposed about the tank; means providing a supporting floor for said filter-bed and having a depression therein affording a receiving sump for filter-bed effluent gravitating thereinto; means for passing feed liquid to be treated to the outer launder; valve-controlled means by which liquid is transferred from the outer launder for distribution over the trickling filter-bed; valve-controlled means by which supernatant overflowing liquid from the settling tank is transferred from the inner launder and distributed over the trickling filter-bed; means for passing filter effluent from the sump to the tank; and means leading from said intermediate launder for releasing liquid as treated effluent leaving the unit.

4. Apparatus for the treatment of impure liquids polluted with septical organics comprising a mechanically cleaned clarifier provided with a sediment discharge outlet, means for supplying impure liquid to the apparatus, means determining the liquid level in the clarifier, launder means for receiving liquid from the clarifier, outlet means for releasing treated effluent from the apparatus, a trickling filter-bed having a bottom that supports discrete filter media annularly disposed around the clarifier with the top of the filter media at a general elevation below that of the liquid level in the clarifier, a sump section in said bottom wherein accumulates liquid that has trickled through the filter-bed; means for continually passing liquid from the sump section to the clarifier; and a plurality of flow pipes extending outwardly from the launder means to the filter-bed adapted to distribute liquid by gravity flow from the launder means substantially uniformly to corresponding areas of the filter bed, said launder means comprising one launder to which the outlet means is connected and a second launder submerged in the clarifier liquid from which clarifier liquid passes to the filter-bed through said gravity flow pipes.

5. Apparatus for the treatment of impure liquids polluted with septical organics comprising a mechanically-cleaned clarifier provided with a sediment discharge outlet, means for supplying impure liquid to the apparatus, means determining the liquid level in the clarifier, launder means for receiving liquid from the clarifier, outlet means connected to said clarifier for releasing treated effluent from the apparatus, a trickling filter-bed having a bottom that supports discrete filter media annularly disposed around the clarifier with the top of the filter media at a general elevation below that of the liquid level in the clarifier, a sump section in said bottom wherein accumulates liquid that has trickled through the filter-bed; means for continually adding liquid from the sump section to the clarifier; and a plurality of flow pipes extending outwardly from the clarifier to the filter bed adapted to distribute liquid by gravity flow from the launder means substantially uniformly to corresponding areas of the filter bed, in which apparatus launder means extend marginally along the top portion of the clarifier and comprise a partitioning wall rising from the bottom of the launder and terminating at an elevation lower than the overflow level of the clarifier, said partitioning wall defining an inner and an outer launder section, the inner launder section adapted to receive the primary overflow from the clarifier and having connected therewith said pipes for passing clarifier effluent liquid by gravity flow to the filter bed, said outer launder section being adapted to receive excess clarified liquid overflowing said partitioning wall from said inner launder section and being connected with said effluent outlet means.

6. Apparatus for treating impure liquids comprising in operative combination a primary and a secondary station; (*a*) of which the primary station includes a settling tank equipped with means for transferring sedimented material therefrom, a set of inner and outer marginal launders of which the inner launder is disposed for receiving liquid overflowing from the tank and of which the outer launder is disposed for receiving a quantity of liquid overflowing from said inner launder, a trickling filter-bed of discrete material surrounding said tank, means providing a floor structure for said bed and having a sump for receiving filter discharge gravitating thereinto, means for conducting liquid from said inner launder and for distributing the liquid over the trickling filter-bed, feed supply means for passing liquid to be treated to said tank, pumping means, a pump inlet connection between the pumping means and the sump, a valve controlled pump outlet connection for optionally passing liquid from the sump and from the pumping means back to the tank, and valve controlled conduit means for optionally passing liquid from said sump and said pumping means to an outer launder of the secondary unit; and (*b*) which said secondary station includes a secondary settling tank equipped with means for transferring sedimented material therefrom; a set of inner, intermediate and outer launders of which the inner launder is disposed for receiving as liquid overflowing from the secondary tank, of which the intermediate launder is disposed for receiving as split-off effluent a quantity of liquid overflowing from the corresponding inner launder, and of which the outer launder is functionally separated from the intermediate launder, a secondary trickling filter-bed of discrete material surrounding the secondary tank, means providing a floor structure for said secondary filter-bed and having a sump for receiving filter discharge gravitating thereinto, means leading from the outer launder of the secondary unit and for distributing the liquid over the secondary trickling filter-bed, means leading from the inner launder of the secondary unit and for distributing the liquid conveyed thereby over the secondary trickling filter-bed, and transfer means for passing liquid from said secondary filter-bed sump into said secondary tank; said apparatus also comprising means for conducting liquid from the outer launder of the primary station to the outer launder of the secondary station, and effluent conducting means leading from the intermediate launder of the secondary station to a locality outside of the apparatus.

7. Apparatus for treating impure liquids comprising a two-stage plant of which each stage comprises a clarifier tank and a circumjacent trickling filter-bed having a bottom that supports discrete filter media, a sump section in said bottom, a pump for drawing filter discharge from the sump, a conduit connecting the pump and the clarifier tank, launder means for determining the liquid level in the tank and for receiving liquid overflowing therein from the tank, gravity operated flow means for conducting liquid from the launder means to the filter-bed and for distributing such liquid thereover; said two stages being supplemented by means for supplying feed liquid to the tank of the primary stage, means for transferring liquid from the launder means of the primary tank to the launder means of the secondary tank, and means for releasing treated liquid from the secondary stage.

8. Apparatus according to claim 7, having a conduit section leading from said pump of the primary tank to said transfer means supplying the secondary tank.

9. Apparatus according to claim 7, according to which there is provided a valve for shutting off any direct supply of incoming liquid to the primary tank and in which there is a conduit section leading from a portion of the feed-supply means that is ahead of said valve and extending to the secondary tank whereby the primary stage may be short-circuited and whereby the secondary stage can be employed as an individual liquid treating stage.

10. Apparatus for the treatment of impure liquids polluted with septical organics comprising a clarifier provided with a sediment discharge outlet, a feed conduit for passing to the interior of the clarifier impure liquids supplied for treatment in the apparatus, a check valve in said feed conduit for permitting a forward flow through the feed conduit into the clarifier but for preventing a backward flow through the conduit, a supernatant liquid outlet means including a member that determines the liquid level in the clarifier, a trickling filter functionally associated with the clarifier and embodying a bed of discrete material constituting a biologically active trickling filter bed and a bottom supporting said bed, a sump section in said bottom wherein accumulates liquid that trickles from the filter bed, a filter effluent transfer means comprising a pump for continually passing effluent from the sump section and having a pump discharge pipe connected for delivering the pumped effluent into the feed conduit at the delivery side of the check valve thereof, and means for passing liquid from the supernatant liquid outlet means and for distributing it over the filter bed.

11. In combined apparatus of the class described for treating impure liquids including a trickling filterbed; a sedimentation tank for quiescent settling including a partially submerged feedwell within the tank, means for passing sediment from the tank, and effluent overflow means functionally and spacedly separate from said feedwell for determining the liquid level in the tank; means for passing discharge from said filterbed to the feedwell; and a feed conduit for passing to the feedwell impure liquid supplied for treatment in the combined apparatus; the combination therewith of means for collecting substantially clarified bacterially-active filterbed-inoculating liquid having a submerged inlet section in the tank located lower than the overflow elevation of the overflow means but higher than that of the lower end of the feedwell while disposed in plan view in a region proximate the feedwell but remote from the overflow means, and means adapted to pass liquid from the collecting means to and for treatment in the filterbed including a conduit extending from the collecting means to the outside of the tank.

12. Apparatus according to claim 11 wherein the liquid collecting means derives support from the feedwell.

13. Apparatus according to claim 11 wherein the liquid collecting means and the feedwell have a wall in common.

14. In combined apparatus of the class described for treating impure liquids, including a trickling filterbed; a sedimentation tank for quiescent settling including a centrally located partially submerged feedwell within the tank, sediment-discharge means leading from the tank, sludge-moving means having sludge impelling elements rotatable in a closed horizontally extending pathway for passing sedimented sludge to said discharge means, means passing through the feedwell for rotating the sludge-moving means, and an effluent launder functionally and spacedly separate from the feedwell and having an overflow edge determining the liquid level in the tank; means for passing filtered discharge to the feedwell: and a feed conduit for passing to the feedwell impure liquid supplied for treatment in the combined apparatus: the combination therewith of means for collecting substantially clarified bacterially-active filterbed-inoculating liquid having an inlet section submerged in the tank to an elevation lower than that of the overflow edge of the launder but higher than the lower end of the feedwell while disposed in plan view in a region proximate the feedwell but remote from the launder, and means adapted to pass liquid from the collecting means to and for treatment in the filterbed including a conduit section extending in the tank above the pathway of the sludge-moving means frrom the collecting means to the outside of the tank.

DOUGLAS C. REYBOLD.
ANTHONY J. FISCHER.